US009870875B1

United States Patent
Phillips (10) Patent No.: US 9,870,875 B1
(45) Date of Patent: Jan. 16, 2018

(54) SUPER DIELECTRIC CAPACITOR USING SCAFFOLD DIELECTRIC

(71) Applicant: The United States of America, as represented by the Secretary of the Navy, Washington, DC (US)

(72) Inventor: Jonathan Phillips, Pacific Grove, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/620,983

(22) Filed: Jun. 13, 2017

Related U.S. Application Data (63) Continuation-in-part of application No. 15/239,039, filed on Aug. 17, 2016, and a continuation-in-part of application No. 14/850,410, filed on Sep. 10, 2015, now Pat. No. 9,711,293.

(60) Provisional application No. 62/457,418, filed on Feb. 10, 2017.

(51) Int. Cl.
   *H01G 11/62* (2013.01)
   *H01G 9/04* (2006.01)
   *H01G 4/04* (2006.01)

(52) U.S. Cl.
   CPC ............... *H01G 11/62* (2013.01); *H01G 4/04* (2013.01)

(58) Field of Classification Search
   None
   See application file for complete search history.

(56) References Cited

U.S. PATENT DOCUMENTS

| | | | |
|---|---|---|---|
| 3,138,746 A | 6/1964 | Burger et al. | |
| 3,547,423 A | 12/1970 | Jenny et al. | |
| 3,700,975 A | 10/1972 | Butherus et al. | |
| 6,454,816 B1 | 6/2002 | Lee et al. | |
| 9,082,548 B2* | 7/2015 | Masuda | H01G 4/01 |
| 2009/0052110 A1* | 2/2009 | Masuda | H01G 4/005 |
| | | | 361/303 |
| 2011/0304953 A1 | 12/2011 | Zhou et al. | |
| 2012/0077095 A1* | 3/2012 | Roumi | H01G 11/02 |
| | | | 429/405 |

(Continued)

OTHER PUBLICATIONS

Wakai,"How Polar Are Ionic Liquids? Determination of the Static Dielectric Constant of an Imidazolium-based Ionic Liquid by Microwave Dielectric Spectroscopy," J. Phys. Chem. B, vol. 109, No. 36 (2005).

(Continued)

*Primary Examiner* — Dion R Ferguson
(74) *Attorney, Agent, or Firm* — Naval Postgraduate School; James B. Potts (57) ABSTRACT

A capacitor having first and second electrodes and a scaffold dielectric. The scaffold dielectric comprises an insulating material with a plurality of longitudinal channels extending across the dielectric and filled with a liquid comprising cations and anions. The plurality of longitudinal channels are substantially parallel and the liquid within the longitudinal channels generally has an ionic strength of at least 0.1. Capacitance results from the migrations of positive and negative ions in the confined liquid in response to an applied electric field. A method of supplying power to a load using the capacitor and a method of making the capacitor is additionally disclosed.

20 Claims, 2 Drawing Sheets

(56) References Cited

U.S. PATENT DOCUMENTS

2014/0016254 A1* 1/2014 Strout .................. B60S 1/0491
361/679.01

OTHER PUBLICATIONS

Sato et al., "Electrochemical properties of novel ionic liquids for electric double layer capacitor applications," Electrochimica Acta 49 (2004).
Lu et al.,"High performance electrochemical capacitors from aligned carbon nanotube electrodes and ionic liquid electrolytes," Journal of Power Sources 189 (2009).
Younesi et al., "Lithium salts for advanced lithium batteries: Li-metal, Li—O2, and Li—S," Energy Environ. Sci.8 (2015).
Bo et al., "Molecular Insights into Aqueous NaCl Electrolytes Confined within Vertically-oriented Graphenes," Sci. Rep. 5 (2015).
Kotz et al,"Principles and applications of electrochemical capacitors," Electrochimica Acta 45 (2000).
Akinwolemiwa et al., "Redox Electrolytes in Supercapacitors," Journal of The Electrochemical Society, 162 (5) (2015).
Conway et al.,"Transition from "Supercapacitor" to "Battery" Behavior in Electrochemical Energy Storage," J. Electrochem. Soc. 138(6) (1991).
Liu et al., "Understanding electrochemical potentials of cathode materials in rechargeable batteries," Materials Today 19(2) (2016).
Chen,"Understanding supercapacitors based on nano-hybrid materials with interfacial conjugation," Progress in Natural Science: Materials International 23(3) (2013).

* cited by examiner

SUPER DIELECTRIC CAPACITOR USING SCAFFOLD DIELECTRIC

RELATION TO OTHER APPLICATIONS

This application claims priority to and the benefit of U.S. application Ser. No. 15/239,039 filed Aug. 17, 2016, U.S. application Ser. No. 14/850,410 filed Sep. 10, 2015, and U.S. Application No. 62/457,418 filed Feb. 10, 2017, which are hereby incorporated by reference in their entirety.

FIELD OF THE INVENTION

The present invention is directed to dielectric materials. In particular the present invention is directed to dielectric materials having high dielectric constants.

BACKGROUND

There are several distinct capacitor technologies, such as super capacitors and traditional electrostatic, also known as 'dielectric', capacitors. Super capacitors increase capacitance by increasing the surface area of the electrically conductive electrode. Most of the volume of a super capacitor is the high surface area electrode, which is basically in powder form. Increasing the super capacitor 'depth' while keeping constant the shape/surface area of the attaching ends, increases the amount of electrode material area and increases the capacitance. Consistent with this paradigm is the recent interest in employing graphene in super capacitors, as graphene is very good for that purpose. Indeed, graphene has very high electrical conductivity and the measured surface of some graphene forms are near the theoretical limit (~2700 $m^2/gm$). Given that the electrode surface area of graphene in super capacitors is near its theoretical limit, further dramatic energy density increases in these devices is unlikely.

In contrast to the improvements made with super capacitors, there has only been a marginal advance in the last few decades in finding materials with superior dielectric constants for the traditional electrostatic capacitor that is a capacitor built of a single dielectric material with a high dielectric constant sandwiched between two flat conductive electrodes. One clear functional contrast between super capacitors and electrostatic capacitors is the impact of 'depth' or 'thickness'. In an electrostatic capacitor, capacitance increases inversely to the distance between plates. Thus, given plates of a constant size, the thinner an electrostatic capacitor, the greater the capacitance. Therefore in order to improve the performance of this style of capacitor they either have to be made thinner and/or use materials with higher and higher dielectric constants.

SUMMARY

Provided here is a capacitor comprising a first electrode, a second electrode, and a scaffold dielectric between the first and second electrode. The scaffold dielectric comprises an insulating material and a plurality of longitudinal channels extending through the insulating material generally from the first electrode to the second electrode. The scaffold dielectric further comprises a liquid within each longitudinal channel and contacting the first and second electrodes, with the liquid comprising cations and anions. Typically the liquid has an ionic strength of at least 0.1 where the ionic strength is a function of the concentration of all cations and anions present. In other embodiments, the liquid is a solution comprising a solvent and a solute with the solute having a molarity of at least 0.1 moles solute per liter of solvent, and in a further embodiment, the solute is a polar liquid having a dielectric constant of at least 5. In some embodiments, the plurality of longitudinal channels is present within a specific volume of scaffold dielectric such that the specific volume has a solid volume fraction of less than 98%, typically less than 80%. Within the capacitor, the cations and anions in the confined liquid of the scaffold dielectric migrate within the ionic solution to create dipoles in response to an applied electric field.

The novel apparatus and principles of operation are further discussed in the following description.

BRIEF DESCRIPTION OF THE DRAWINGS

Embodiments in accordance with the invention are further described herein with reference to the drawings.

DETAILED DESCRIPTION OF THE INVENTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to a capacitor utilizing a scaffold dielectric to provide capacitance resulting from migrations of positive and negative ions in a confined ionic solution within the scaffold dielectric.

Provided here is a capacitor comprising a first electrode, a second electrode, and a scaffold dielectric between the first and second electrode. The scaffold dielectric comprises an insulating material having a plurality of longitudinal channels extending through the insulating material between the first and second electrode, with the longitudinal channels filled with a liquid comprising cations and anions. Within the scaffold dielectric, both the insulating material and the liquid in each channel are in contact with the first electrode and second electrode, and the plurality of channels extending through the insulating material are typically present such that a volume of the scaffold dielectric comprising the insulating material, the plurality of channels, and the liquid has a solid volume fraction of less than about 98%, typically less than 80%. In a typical embodiment, the liquid within the plurality of longitudinal channels has an ionic strength of at least 0.1 where the ionic strength is a function of the concentration of all cations and anions present in the ionic solution. In another embodiment, the first and second electrode have a surface area <10 $m^2/gm$, in order to minimize interactions with the electrode and increase energy densities within the liquid. In operation and generally, capacitance results from the migrations of positive and negative ions in the confined liquid in response to an applied electric field.

Figure 1A:
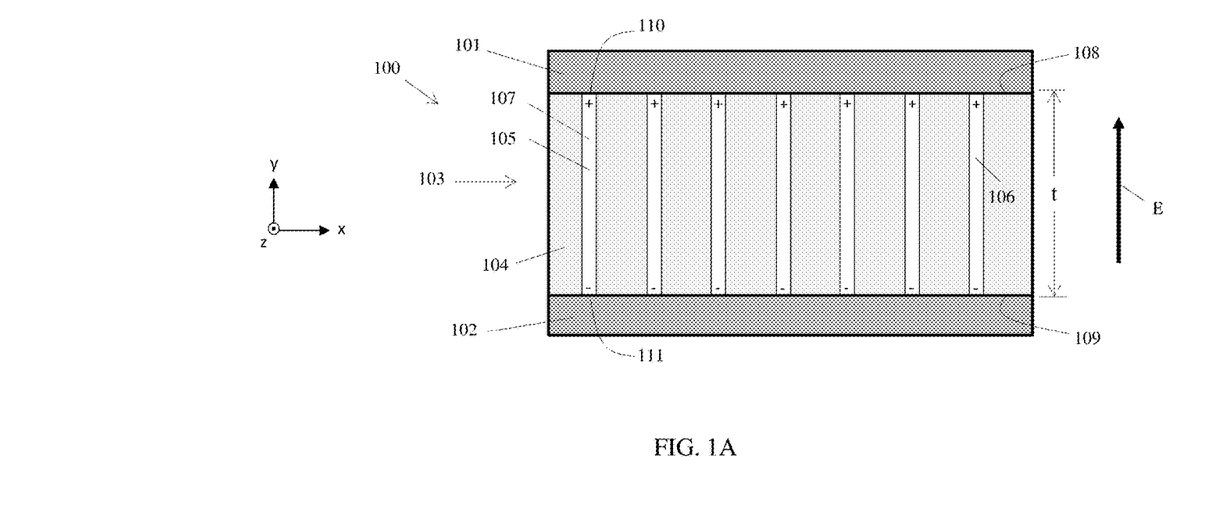
FIG. 1A illustrates an embodiment of the capacitor disclosed.
Figure 1B:
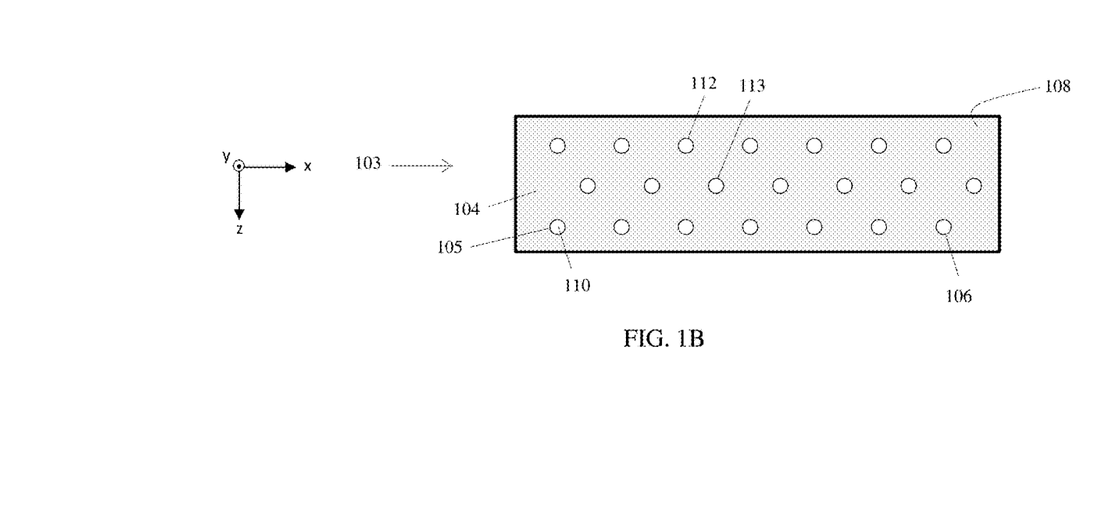
FIG. 1B illustrates an embodiment of the scaffold dielectric.

A particular embodiment of a capacitor 100 is generally illustrated at FIG. 1A in accordance with the axes shown. Capacitor 100 comprises a first electrode 101 and a second electrode 102 generally comprised of a conductive material. A scaffold dielectric generally indicated by 103 separates first electrode 101 and second electrode 102, with scaffold dielectric 103 comprising an insulating material 104, a plurality of longitudinal channels such as 105 and 106, and a liquid residing within each longitudinal channel such as 107. Scaffold dielectric 103 spans a distance t separating first electrode 101 and second electrode 102. FIG. 1B represents an alternate view of scaffold dielectric 103 illustrated in accordance with the indicated axes.

Liquid 107 comprises ions, such as the cations + and anions − indicated within longitudinal channel 105. In a typical embodiment, liquid 107 has an ionic strength of at least 0.1 where the ionic strength is a function of the concentration of all cations and anions present in liquid 107. In other embodiments, liquid 107 comprises a solvent and a solute and the solute has a molarity of at least 0.1 moles solute per liter of solvent, and in a further embodiment, the solute is a polar liquid having a dielectric constant of at least 5. Within capacitor 100 and scaffold dielectric 103, the ions + and − in the liquid migrate to create dipoles in response to an applied electric field, such as the electric field E generated from electrode 102 to electrode 101 at FIG. 1A. This ion separation greatly increases the effective dielectric constant of scaffold dielectric 103 located between first capacitor electrode 101 and second capacitor electrode 102, and greatly increases the amount of charge that can be stored in capacitor 100 as compared to conventional capacitors of the same physical size. In a typical embodiment, liquid 107 is an aqueous solution and the solute is a salt, an acid, or a base. The insulating material 104 typically has an electrical conductivity of less than about $10^{-8}$ S/cm.

The scaffold dielectric 103 of FIGS. 1A and 1B differs significantly from typical dielectric materials. As is understood, typical dielectric materials generally increase the amount of electric charge stored on a capacitor by lowering the voltage associated with the number of charges. This results from the formation of dipoles in the dielectric that opposes the applied field, thus reducing the net field for any specific charge concentration on the electrode. As capacitance is charge/voltage, the lowering of the voltage for any given number of charges increases capacitance. Typically these dipoles are generally a fraction of an angstrom (A) in length, meaning longer dipoles would reduce the net field to an even greater extent. In contrast, the scaffold dielectric 103 of capacitor 100 comprising the plurality of longitudinal channels and filled with liquid 107 comprising cations and anions will have much larger dipoles than found in any solid, and hence will have better dielectrics than any solid or any pure liquid for which the dipole length is no greater than the length of the molecules that compose the liquid.

Similarly, capacitor 100 differs significantly from typical energy storage devices utilizing liquids as an inherent component. For example, capacitors known generally as electrolytic capacitors generally utilize an oxide film as the dielectric with a liquid electrolyte serving as an extension of one electrode, and the liquid electrolyte is typically in contact with only the one electrode and the dielectric oxide layer, as opposed to both electrodes as in capacitor 100. Similarly, electric double-layer capacitors (EDLC) rely on electrostatic storage achieved by separation of charge in a Helmholtz double layer at the interface between the surface of a conductor electrode and an electrolytic solution, with the two layers of ions at the interface acting like a dielectric in a conventional capacitor. The double layer thickness is generally a material property of the electrode, and correspondingly increases in capacitance generally require increases in the specific surface area of the electrode. Graphene having surface areas in excess of 1000 $m^2$/gm are typically utilized in order to generate the double layer over a wide area. In contrast and in certain embodiments, capacitor 100 utilizes electrode materials having specific surface areas less than about 10 $m^2$/gm in order to minimize interactions with the electrode and increase energy densities within liquid 107. Additionally, capacitor 100 differs significantly from devices such as those known generally as pseudo-capacitors and capacitor batteries, which rely on redox activity between an electrolyte and electrode, or an intercalaction/deintercalation process where electrolyte ions undergo reversible inclusion into electrode materials having layered structures. Typically and in certain embodiments, the positive and negative ions of liquid 107 in capacitor 100 do not comprise atoms or molecules of the majority materials comprising at least first electrode 101 or at least second electrode 102, and redox or intercalation processes remain substantially absent.

At FIGS. 1A and 1B, insulating material 104 has a first side 108 and a second side 109, with first side 108 in contact with first electrode 101 and second side 109 in contact with second electrode 102 across the distance t. The plurality of longitudinal channels such as 105 and 106 extend from first side 108 to second side 109 of insulating material 104, such that each longitudinal channel forms a first aperture in first side 108 of insulating material 104 and a second aperture in second side 109 of insulating material 104. For example, at FIG. 1A, longitudinal channel 105 extends through insulating material 104 from first side 108 to second side 109 and comprises first aperture 110 in first side 108 and second aperture 111 in second side 109. First aperture 110 of longitudinal channel 105 is additionally shown at FIG. 1B with respect to insulating material 104 and first side 108. Longitudinal channel 106 is also shown for reference, as well as additional members of the plurality of longitudinal channels such as 112 and 113. In an embodiment, the plurality of longitudinal channels comprises scaffold dielectric 104 such that a 1 $cm^2$ area of scaffold dielectric 103 comprising some portion of first side 108 includes at least 10 first apertures per $cm^2$ of area, and similarly such that a 1 $cm^2$ area of scaffold dielectric 103 comprising some portion of second side 109 includes at least 10 second apertures per $cm^2$ of area. In another embodiment, the plurality of longitudinal channels comprises scaffold dielectric 103 such that insulating material 104 has a solid volume fraction of less than about 98%, and in a further embodiment, less than about 80%. In other embodiments, capacitor 100 has a sufficient quantity of first apertures to generate a percent effective area of at least 10%, in some embodiments at least 30%, and in other embodiments at least 60%, where the percent effective area is the combined area in $cm^2$ of all first apertures in first side 108 over a 1 $cm^2$ area of first side 108, multiplied by 100%.

As an example, FIG. 3 illustrates a volume of scaffold dielectric 203 bounded by points A, B, C, D, E, F, G, and H and in accordance with the axes shown. Scaffold dielectric 203 comprises insulating material 204 comprising first side 208 enclosed within the boundary A-B-C-D and second side 209 enclosed within the boundary E-F-G-H. Scaffold dielectric 203 further comprises a plurality of longitudinal channels, exemplified by longitudinal channel 205, which extends from first side 208 to second side 209. Each longitudinal channel comprises a first and second aperture on the respective sides, exemplified by first aperture 210 of longitudinal channel 205 on first side 208 and second aperture 211 of longitudinal channel 205 on second side 209. Additionally illustrated for reference is longitudinal channel 212 comprising first aperture 214 and second aperture 215, and longitudinal channel 213 comprising first aperture 216 and second aperture 217. The first and second apertures are in fluid communication with each other through the longitudinal channel. Further at FIG. 2, the boundary A-B-C-D surrounds an area of scaffold dielectric 203 comprising at least some portion of first side 208 of insulating material 203, and the boundary E-F-G-H surrounds an additional area of scaffold dielectric 203 with the additional area comprising at least some portion of second side 209 of insulating material 203. A specific volume of scaffold dielectric 203 comprising some portion of first area 208, some portion of second area 209, and the plurality of longitudinal channels, is bounded by A-B-C-D-E-F-G-H. In certain embodiments, the plurality of longitudinal channels is present within a specific volume of scaffold dielectric 203 comprising some portion of first area 208, some portion of second area 209, and the plurality of longitudinal channels such the specific volume has a solid volume fraction of less than 98%. Here, the solid volume fraction is equal to $(1-V_I/V_D) \times 100\%$, where $V_D$ is the specific volume of the scaffold dielectric such as that bounded by A-B-C-D-E-F-G-H, and $V_I$ is the volume of insulating material within the specific volume such as A-B-C-D-E-F-G-H. In other embodiments, the volume of scaffold dielectric 203 has a solid volume fraction of less than 90%, in other embodiments less than 80%, and in further embodiments less than 50%.

In further embodiments, the plurality of longitudinal channels are substantially parallel. Here, "substantially parallel" means that every longitudinal channel has a longitudinal axis extending through its first aperture and second aperture, and that further there is a particular direction vector for which an angle between the particular direction vector and every longitudinal axis is less than less than 30 degrees, less than 15 degrees, or less than 5 degrees. For example at FIG. 2, longitudinal channel 212 has a longitudinal axis $L_1$ and longitudinal channel 213 has a longitudinal axis $L_2$, and $L_1$ and $L_2$ are substantially parallel to the particular direction vector $V_1$. When the plurality of longitudinal channels are substantially parallel, every longitudinal channel in the plurality has an analogous longitudinal axis and the angle between each longitudinal axes and the particular direction vector $V_1$ is less than 30 degrees, less than 15 degrees, or less than 5 degrees.

Figure 2:
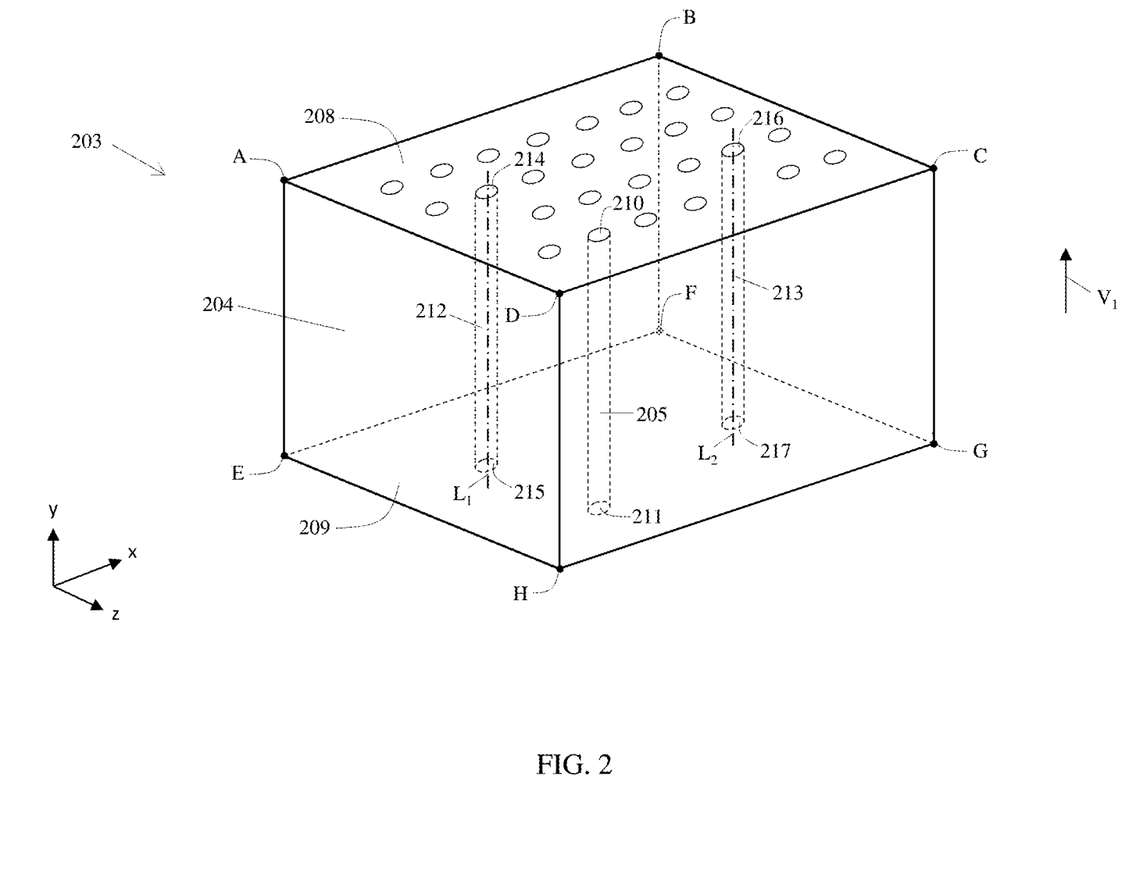
FIG. 2 illustrates another embodiment of the scaffold dielectric.

In additional embodiments, the boundary A-B-C-D of FIG. 2 surrounds a 1 $cm^2$ area of scaffold dielectric 203 with the 1 $cm^2$ area comprising at least a portion of first side 208 of insulating material 203, and the 1 $cm^2$ area comprises at least 10 first apertures. Similarly, the boundary E-F-G-H surrounds an additional 1 $cm^2$ area of scaffold dielectric 203 with the additional 1 $cm^2$ area comprising at least a portion of second side 209 of insulating material 203, and the additional 1 $cm^2$ area comprises at least 10 second apertures.

The liquid 107 within the pores of porous material 104 may be any liquid comprising ions. As discussed, in certain embodiments liquid 107 has an ionic strength of at least 0.1, where the ionic strength is a function of the concentration of all cations and anions present in liquid 107. In some embodiments, the ions comprising liquid 107 comprise cations and anions and the cations have an ionic concentration of at least 0.1 moles per liter of liquid and the anions have an ionic concentration of at least 0.1 moles per liter of liquid. See IUPAC, *Compendium of Chemical Terminology* (the "Gold Book") ($2^{nd}$, 1997). In other embodiments, liquid 107 is a solution comprising a solvent and a solute and the solute has a molarity of at least 0.1 moles solute per liter of solvent. In another embodiment, the solute is a polar liquid having a dielectric constant of at least 5, preferably at least 15, and in a further embodiment the solute is a salt, acid, base, or mixtures thereof. Here, "salt" includes nitrates, nitrides, carbides, alkali halides, metal halides and other crystal structures that dissolve in water to create dissolved ions. In certain embodiments, the solvent of liquid 107 is saturated with the solvent to at least a 1% saturation, and in other embodiments at least 10%. In another embodiment, the solvent is water and liquid 107 is an aqueous solution. Additionally, liquid 107 may comprise an organic solvent, containing an electrolyte selected from an acid, a base, and a neutral salt. Also, liquid 107 may be a liquid such as those found in acid or base solutions, salt solutions, other electrolytic solutions or ionic liquids of any kind. As disclosed herein, the liquid comprising ions may be any liquid or mixture of liquids, solvents, solutes and the like which provide ions in a liquid as described. See e.g. Gandy et al., "Testing the Tube Super Dielectric Material Hypothesis: Increased Energy Density Using NaCl," *J. Electron. Mater.* 45 (2016); see also Quintero et al., "Tube-Super Dielectric Materials: Electrostatic Capacitors with Energy Density Greater than 200 J·cm-3," *Materials* 8 (2015); see also Fromille et al., "Super Dielectric Materials," *Materials* 7 (2014); see also Quintero et al., "Super Dielectrics Composed of NaCl and $H_2O$ and Porous Alumina," *J. Electron. Mater.* 44 (2015); see also Jenkins et al., "Investigation of Fumed Aqueous NaCl Superdielectric Material," *Materials* 9 (2016); see also Phillips et al., "Novel Superdielectric Materials: Aqueous Salt Solution Saturated Fabric," *Materials* 9 (2016); see also U.S. Pat. No. 9,530,574 issued to Phillips et al., issued Dec. 27, 2016; see also U.S. patent application Ser. No. 15/239,039 filed by Phillips et al., filed Aug. 17, 2016.

The plurality of longitudinal channels may comprise any group of channels extending through the scaffold dielectric as described. The longitudinal channels may be present within insulating material 104 as result of a manufacture or fabrication, or may arise within insulating material 104 as a result of natural processes. In a particular embodiment, each longitudinal channel in the plurality has a first aperture and second aperture, with the first aperture in fluid communication with the second aperture. Further, the plurality of longitudinal channels may comprise first and second apertures having any mean diameter, such that the first and second apertures may be characterized as micropores (diameter<2 nm), mesopores (2 nm≤diameter≤50 nm), macropores (diameter>50 nm), or some combination. Typically the mean diameter is less than 1 mm, and may be greater than, equal to, or less than the distance t of FIG. 1A. The mean pore diameter may be known as a result of a specific manufacture, for example, use of a punch press or like device having a punch of a specific diameter, or may otherwise be determined using means known in the art such as scanning electron microscopy, transmission electron microscopy, bubble point methods, mercury porosimetry, thermoporometry, permporometry, adsorption/desorption methods, and the like. See e.g., Stanley-Wood et al., *Particle Size Analysis* (1992), among others.

Insulating material 104 may be any material having a plurality of longitudinal pores where ion-containing liquid may reside. In an embodiment, insulating material 104 comprises a constituent material having a conductivity less than $10^{-8}$ S/cm. In other embodiments, the constituent material comprises at least 5 wt. %, at least 50 wt. %, at least 70 wt. %, or at least 90 wt. % of insulating material 104. As used here, "constituent material" may describe a material of singular composition or a combination of materials having different compositions. In further embodiments, insulating material 104 has a conductivity less than $10^{-8}$ S/cm. In some embodiments, insulating material 104 comprises a polymer material having the characteristics as disclosed herein. Generally, "polymer" means a naturally occurring or synthetic compound consisting of large molecules made up of a linked series of repeated simple monomers. Exemplary polymers include those known as Low-density polyethylene (LDPE), High-density polyethylene (HDPE), Polypropylene (PP), Polyvinyl Chloride (PVC), Polystyrene (PS), Nylon, nylon 6, nylon 6,6, Teflon (Polytetrafluoroethylene), Thermoplastic polyurethanes (TPU), and others. In some embodiments, insulating material 104 comprises an oxide such as alumina, silica, titania, magnesia, and other metal oxides. However, porous material 104 may comprise any material having characteristics as disclosed herein, including fabrics, fibers, sponges, polymer materials such as nylon, and other materials. Liquid may be placed in the plurality of longitudinal channels using any effective means known in the art, including brushing, spraying, direct immersion, various pressure and vacuum methods, and others.

First electrode 101 and second electrode 102 may be any conducting material. In a particular embodiment, first electrode 101 and second electrode 102 comprise a conductive material having conductivity greater than $10^3$ S/cm. In certain embodiments, first electrode 101 comprises a first conductive material having conductivity greater than $10^3$ S/cm and the first conductive material comprises at least 50 weight percent (wt. %), at least 70 wt. %, or at least 90 wt. % of first electrode 101, and in further embodiments, second electrode 102 comprises a second conductive material having a conductivity greater than $10^3$ S/cm and the second conductive material comprises at least 5 wt. %, at least 50 wt. %, at least 70 wt. %, or at least 90 wt. % of second electrode 102. As used here, "conductive material" may describe a material of singular composition or a combination of materials having different compositions. In further embodiments, first electrode 101 and second electrode 102 have a conductivity greater than $10^3$ S/cm. Additionally, although represented as substantially planer elements in FIGS. 1A and 1B, first electrode 101, second electrode 102, and scaffold dielectric 103 may be planar, curved, or some combination, and capacitor 100 may have any shape including spiral wound or parallel plate provided the requirements of this disclosure are met.

As discussed, capacitor 100 differs significantly from typical devices utilizing liquids as energy storage or delivery components. For example, unlike electrolytic capacitors and among other distinctions, capacitor 100 utilizes an ionic solution in contact with both first electrode 101 and second electrode 102. Similarly, unlike a high specific surface area EDLC, capacitor 100 generally relies on large induced electric dipoles formed within liquid 107 residing within the longitudinal channels in order to enable maximum energy densities and dielectric values, as opposed to separation of charge in a Helmholtz double layer at an electrode/electrolyte interface. In certain embodiments, capacitor 100 utilizes electrode materials having specific surface areas less than about 10 $m^2$/gm in order to minimize interactions with the electrode and increase energy densities within liquid 107. Capacitor 100 also has a substantial absence of electrochemical activity among the ions of liquid 107, first electrode 101, and second electrode 102, and differs significantly from devices that rely on redox or other electrochemical activity between an electrolyte and electrode. In certain embodiments, the redox potentials among the components are sufficiently similar such that first electrode 101 has a first redox potential $E_1^0$ under standard conditions, the positive ion of liquid 107 has a positive ion redox potential $E_+^0$ under standard conditions, and the negative ion of liquid 107 has a negative ion redox potential $E_-^0$ under standard conditions, and an absolute value of $E_+^0$ divided by $E_1^0$ is greater than 0.9, in some embodiments greater than 0.95, and in other embodiments greater than 0.99. In other embodiments, second electrode 102 has a second redox potential $E_2^0$ under standard conditions, and an absolute value of $E_+^0$ divided by $E_2^0$ is greater than 0.9, in some embodiments greater than 0.95, and in other embodiments greater than 0.99. In other embodiments, an absolute value of $E_-^0$ divided by $E_1^0$ is greater than 0.9, in some embodiments greater than 0.95, and in other embodiments greater than 0.99, and in other embodiments, an absolute value of $E_-^0$ divided by $E_2^0$ is greater than 0.9, in some embodiments greater than 0.95, and in other embodiments greater than 0.99. Capacitor 100 also generally experiences an absence of positive or negative ions undergoing reversible inclusions into electrode materials through intercalaction/deintercalation processes. In certain embodiments, the positive ions and negative ions of liquid 107 are not ions of an atom or molecule comprising the first conductive material comprising first electrode 101, and in other embodiments, the positive ions and negative ions of liquid 107 are not ions of an atom or molecule comprising the second conductive material comprising second electrode 102. Typically the same conductive material is used for both electrodes and, at all stages of charge and discharge, the electrodes remain substantially identical to each other.

The disclosure further provides a method of supplying power to a load using the capacitor disclosed. The method comprises applying a first voltage to the first electrode and a second voltage to the second electrode, where a difference between the second voltage and the first voltage is less than a breakdown voltage of the liquid comprising the scaffold dielectric, and generating a charged capacitor. The method further comprises electrically connecting the charged capacitor to the load and discharging the charged capacitor to the load, thereby supplying power to the load.

The disclosure additionally comprises a method of making the capacitor disclosed. The method comprises contacting the liquid comprising ions and the first side of the insulating material for a sufficient time to allow some portion of the liquid comprising ions to enter and fill the plurality of longitudinal channels between the first aperture and the second aperture of every longitudinal channel. The method further comprises contacting the first side of the insulating material and the first electrode, contacting the second side of the insulating material and the second electrode, and contacting the liquid comprising ions within each longitudinal channel with the first electrode and second electrode, in order to place the first and second side of the insulating material in contact with the first and second electrode respectively, and in order to place the liquid comprising ions in contact with the first electrode and the second electrode, as disclosed. In a particular embodiment, the method further comprises utilizing a particular material for the insulating material where the particular material comprises constituent material having a conductivity less than $10^{-8}$ S/cm, and utilizing a particular liquid for the liquid where the particular liquid has an ionic strength of at least 0.1. As previously discussed, contacting the liquid and the first side of the insulating material may be accomplished using any effective means known in the art, including brushing, spraying, direct immersion, various pressure and vacuum methods, and others.

Description of a Specific Embodiment

A capacitor with energy density of ~75 J/cm$^3$ of dielectric material was made using a unique form of super dielectric material. The novel super dielectric, herein called D-1, consisted of a piece of hydrophobic polypropylene plastic sheet (Celgard PP1516), 2.5 cm×2.5 cm×16 micron (thickness), into which 325 holes (~50 holes/cm$^2$) were through punched with a pin of diameter 0.6 mm, then smeared with a solution of 30 wt % NaCl in distilled, de-ionized water. Excess water was physically forced off the dielectric, and the wetted dielectric sheet placed between two carbon electrodes for constant current capacitor testing using a commercial galvanastat. It was found that the capacitor thus constructed, operated between 2.3 and 0 volts, showed virtually no change in behavior over 30 cycles using charge and discharge times of about 300 seconds.

Additional experiments were conducted to test this hypothesis: The high dielectric value and energy density observed for the capacitor constructed with D-1 results from the large induced electric dipoles that are created in the 'salt water' columns that form in the holes punched through the plastic with the pin. In brief, the longer the dipoles in the dielectric and the higher the density of dipoles, the greater the maximum energy density and dielectric value. Relative to solid dielectrics in which the dipole length is a maximum of 0.1 Å, the dipoles formed via field induced ionic migration (Na+ toward negative electrode, Cl− toward positive electrode) in the salt water columns of D-1 are enormous.

The hypothesis suggests that the net energy density that a capacitor made from a plastic through which holes have been punched and then filled with aqueous salt solution, should increase with the number of holes punched. For this reason, experiments were conducted to study the impact of hole density on energy density. In each case, a capacitor of the same dimensions as above included a dielectric made in the same fashion as D1. That is, it was made from the same plastic, using the same punch and same salt water solution, but with one major difference: in each case a different number of holes was punched. In the first experiment, a single hole was punched at the center (D-2). A third capacitor (D-3) was made using an identical dielectric but with ~10 holes/cm$^2$, a fourth with ~15 holes/cm$^2$, and a further with ~25 holes/cm$^2$. The outcome predicted by the SDM model, the measured energy density should increase with the number of holes punched, is consistent with the values obtained.

The outcome of this study is significant as it suggests an inexpensive, simple design for high energy density capacitors. That is, it is easy to imagine a simple process for commercial production of the dielectric materials from punched plastic sheets. Indeed, plastic sheet is very inexpensive, punching holes in thin plastic sheet easily and inexpensively organized (e.g. rapidly passing sheet between rotating cylinders containing properly positioned pins), and soaking with 'salt water' also remarkably inexpensive. Moreover, the energy density measured in this 'first effort' is more than double the value available in the current commercial supercapacitor market. Commercial processes could be designed to yield far higher energy density via optimization of the salt solution employed, including organic electrolytes, the hole density, the number of holes, the thickness of the plastic, the identity of the plastic, etc.

In some embodiments liquid 107 further comprises a porous material such as fumed silica with some portion of the liquid 107 residing within the pores of the porous material. The porous material may substantially be an agglomerate comprising consolidated material existing as a relatively rigid, macroscopic body whose dimensions exceed those of the pores by many orders of magnitude, or alternatively may be an aggregate comprising unconsolidated, nonrigid, loosely packed assemblages of individual particles. Additionally, when such particles are present, the particles themselves may be nonporous and surrounded by a network of interparticle voids, or the particles themselves may be significantly porous and porous material may comprise both internal voids and interparticle voids. Additionally, the porous material may comprise a wide distribution of pore sizes, and include micropores (diameter<2 nm), mesopores (2 nm≤diameter≤50 nm), macropores (diameter>50 nm), and combinations thereof. Typically the porous material comprises an insulating material having a conductivity less than 10$^{-8}$ S/cm. In some embodiments, the insulating material comprises at least 5 wt. %, at least 50 wt. %, at least 70 wt. %, or at least 90 wt. % of the porous material. As used here, "insulating material" may describe a material of singular composition or a combination of materials having different compositions. In other embodiments, the porous material has a specific surface area greater than 0.5 m$^2$ of surface/gram, and in other embodiments when the porous material is an aggregate as discussed above, individual particles comprising the aggregate have a specific surface area greater than 0.5 m$^2$ of surface/gram. In other embodiments, the pores of the porous material have a radius between 1-10,000 Å, and in other embodiments have a mean pore diameter between 1-20,000 Å, and in other embodiments have a mean pore diameter between 1-200,000 Å. In certain embodiments when individual particles comprise an aggregate, the individual particles have a mean pore diameter between 1-200,000 Å. In these embodiments, liquid 107 may be located in the pores of the porous material using any means known in the art. For example, the porous material and liquid 107 may be mixed by hand or otherwise to create a spreadable paste with little to substantially no free water (incipient wetness). "Paste" as used herein refers to a thick, soft moist substance, having little to substantially no free water. Other methodologies may be employed as known in the art, including incipient wetness impregnation, direct immersion, capillary impregnation, diffusional impregnation, pressure or vacuum impregnation, and others. The paste may be applied to the scaffold dielectric in any manner sufficient to fill the longitudinal channels.

Thus provided here is a capacitor having a first electrode, a second electrode, and a scaffold dielectric between the first and second electrode, where the scaffold dielectric comprises an insulating material with a plurality of longitudinal channels filled with a liquid comprising cations and anions. Typically the insulating material and the liquid in each channel are in contact with the first electrode and second electrode and the plurality of channels extends through the insulating material from the first side to the second side. The plurality of longitudinal channels are typically present such that a specific volume of the scaffold dielectric has a solid volume fraction of less than about 98%, typically less than 80%. In a typical embodiment, the liquid within the plurality of longitudinal channels has an ionic strength of at least 0.1 where the ionic strength is a function of the concentration of all cations and anions present in the liquid. In operation and generally, capacitance results from the migrations of positive and negative ions in the confined liquid in response to an applied electric field. Additionally disclosed is a method of supplying power to a load using the capacitor, and a method of making the capacitor.

Accordingly, this description provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

TABLE 1

Measured Energy Density and Discharge Time.

| Punched Holes/cm$^2$ | Measured Energy Density, J/cm$^3$ | Discharge Time, sec |
|---|---|---|
| 0.016 (1 hole, center) | <0.01 | <0.1 sec, maximum |
| 3 | 0.3 | 30 |
| 15 | 24 | ~200 |
| 25 | 76 | ~300 |

What is claimed is:

1. A capacitor comprising:
   a first electrode;
   a second electrode; and
   a scaffold dielectric in contact with the first electrode and the second electrode, the scaffold dielectric comprising:
      an insulating material comprising a first side and a second side where the first side is in contact with the first electrode and the second side is in contact with the second electrode; and
      a plurality of longitudinal channels, where every individual longitudinal channel in the plurality of longitudinal channels comprises a first aperture in the first side of the insulating material and a second aperture in the second side of the insulating material; and
      a liquid comprising ions within each longitudinal channel in the plurality of longitudinal channels, where the liquid within the each longitudinal channel is in contact with the first electrode and the second electrode.

2. The capacitor of claim 1 where the insulating material comprises a constituent material having a conductivity less than $10^{-8}$ S/cm.

3. The capacitor of claim 2 where the first electrode and the second electrode comprise a conductive material having conductivity greater than $10^3$ S/cm.

4. The capacitor of claim 3 where the liquid has an ionic strength of at least 0.1.

5. The capacitor of claim 4 where the ions comprise cations and anions and where the cations have an ionic concentration of at least 0.1 moles per liter of liquid and where the anions have an ionic concentration of at least 0.1 moles per liter of liquid.

6. The capacitor of claim 5 where the first electrode has a first redox potential $E_1^0$ under standard conditions, the second electrode has a second redox potential $E_2^0$ under standard conditions, the cations have a positive ion redox potential $E_+^0$ under standard conditions, and where an absolute value of $E_+^0$ divided by $E_1^0$ is greater than 0.95 and an absolute value of $E_+^0$ divided by $E_2^0$ is greater than 0.95.

7. The capacitor of claim 4 where a particular volume of the scaffold dielectric comprises some portion of the first side of the insulating material, comprises some portion of the second side of the insulating material, comprises the plurality of longitudinal channels, and comprises some portion of the insulating material, and where the particular volume of the scaffold dielectric has a solid volume fraction of less than 98%.

8. The capacitor of claim 7 where a 1 cm$^2$ area comprising some portion of the first side of the insulating material comprises at least 10 first apertures and where a 1 cm$^2$ area comprising some portion of the second side of the insulating material comprises at least 10 second apertures.

9. The capacitor of claim 1 where the liquid comprises a solvent and a solute and where the solute has a molarity of at least 0.1 moles solute per liter of solvent.

10. The capacitor of claim 9 where the solvent is a polar liquid.

11. The capacitor of claim 10 where the polar liquid has a dielectric constant of at least 5.

12. The capacitor of claim 11 where the solute is a salt, an acid, or a base.

13. The capacitor of claim 11 where the polar liquid has at least a 10% saturation of the solute in the solvent.

14. A method of supplying power to a load using the capacitor of claim 1 comprising
   applying a first voltage to the first electrode and a second voltage to the second electrode, where a difference between the second voltage and the first voltage is less than a breakdown voltage of the liquid comprising ions within the plurality of longitudinal channels of the scaffold dielectric, thereby generating a charged capacitor; and
   electrically connecting the charged capacitor to the load and discharging the charged capacitor to the load, thereby supplying power to the load.

15. A method of making the capacitor of claim 1 comprising:
   contacting the liquid comprising ions and the first side of the insulating material for a sufficient time to allow some portion of the liquid comprising ions to enter the plurality of longitudinal channels and fill the plurality of longitudinal channels between the first aperture of every single longitudinal channel in the plurality of longitudinal channels and the second aperture of the every single longitudinal channel in the plurality of longitudinal channels; and
   contacting the first side of the insulating material and the first electrode, contacting the second side of the insulating material and the second electrode, and contacting the liquid comprising ions within each individual longitudinal channel in the plurality of longitudinal channels with the first electrode and the second electrode, thereby placing the first side of the insulating material in contact with the first electrode and the second side of the insulating material in contact with the second electrode and thereby placing the liquid comprising ions within the each longitudinal channel in contact with the first electrode and the second electrode, and thereby making the capacitor.

16. The method of claim 15 further comprising:

utilizing a particular material for the insulating material where the particular material comprises constituent material having a conductivity less than $10^{-8}$ S/cm;

utilizing a particular liquid for the liquid where the particular liquid has an ionic strength of at least 0.1.

17. A capacitor comprising:

a first electrode;

a second electrode; and a scaffold dielectric in contact with the first electrode and the second electrode, the scaffold dielectric comprising:

an insulating material comprising a first side and a second side where the first side is in contact with the first electrode and the second side is in contact with the second electrode; and a plurality of longitudinal channels, where every individual longitudinal channel in the plurality of longitudinal channels comprises a first aperture in the first side of the insulating material and a second aperture in the second side of the insulating material, and the plurality of longitudinal channels are present in the scaffold dielectric such that a particular volume of the scaffold dielectric comprising some portion of the first side of the insulating material, some portion of the second side of the insulating material, the plurality of longitudinal channels, and some portion of the insulating material has a solid volume fraction of less than 98%; and a liquid comprising ions within each longitudinal channel in the plurality of longitudinal channels, where the liquid within the each longitudinal channel is in contact with the first electrode and the second electrode, and where the liquid comprises a solvent and a solute and where the solute has a molarity of at least 0.1 moles solute per liter of solvent and the solvent has a dielectric constant of at least 5.

18. The capacitor of claim 17 where the insulating material comprises a constituent material having a conductivity less than $10^{-8}$ S/cm and where the first electrode and the second electrode comprise a conductive material having conductivity greater than $10^3$ S/cm.

19. The capacitor of claim 18 where the solute is a salt, an acid, or a base.

20. The capacitor of claim 19 where the polar liquid has at least a 10% saturation of the solute in the solvent.

* * * * *